United States Patent [19]

Spanier et al.

[11] Patent Number: 4,822,626

[45] Date of Patent: Apr. 18, 1989

[54] COATED CANINE BISCUITS

[75] Inventors: Henry C. Spanier, West Milford, N.J.; Patrick Mulligan, Thiels; Albert Spiel, Yonkers, both of N.Y.; Lorna C. Staples, Teaneck, N.J.

[73] Assignee: Nabisco Brands, Inc., Parsippany, N.J.

[21] Appl. No.: 430

[22] Filed: Jan. 5, 1987

[51] Int. Cl.$^4$ .......................... A23L 1/10; A23K 1/10; A23K 1/18

[52] U.S. Cl. ..................... 426/94; 426/293; 426/303; 426/805

[58] Field of Search .................. 426/293, 303, 94, 805

[56] References Cited

U.S. PATENT DOCUMENTS

| | | | |
|---|---|---|---|
| 1,018,415 | 2/1912 | Ellis | 426/104 |
| 2,784,093 | 3/1957 | Feld | 99/7 |
| 2,945,764 | 7/1960 | Lanz | 99/2 |
| 3,004,852 | 10/1961 | Rothschild | 99/7 |
| 3,119,691 | 1/1964 | Ludington | 426/302 |
| 3,139,342 | 6/1964 | Linskey | 99/2 |
| 3,284,211 | 11/1966 | Williams | 99/2 |
| 3,467,525 | 9/1969 | Hale et al. | 426/293 |
| 3,615,647 | 10/1971 | Kassens | 99/29 |
| 3,679,429 | 7/1972 | Mohrman et al. | 99/2 |
| 3,745,023 | 11/1973 | Greenberg et al. | 99/140 R |
| 3,808,340 | 4/1974 | Palmer | 426/635 |
| 3,808,341 | 4/1974 | Rongey et al. | 426/92 |
| 3,968,255 | 7/1976 | Haas et al. | 426/33 |
| 3,997,675 | 12/1976 | Eichelburg | 426/805 |
| 4,015,026 | 3/1977 | Burkwall, Jr. et al. | 426/805 |
| 4,016,295 | 4/1977 | Barrows et al. | 426/805 |
| 4,029,821 | 6/1977 | Munro | 426/92 |
| 4,039,687 | 8/1977 | Weyn . | |
| 4,039,692 | 8/1977 | Clausen | 426/532 |
| 4,070,490 | 1/1978 | Lugay et al. | 426/805 |
| 4,089,978 | 5/1978 | Lugay et al. | 426/32 |
| 4,104,406 | 8/1978 | Stringer et al. | 426/805 |
| 4,104,407 | 8/1978 | Stringer et al. | 426/99 |
| 4,211,797 | 7/1980 | Cante | 426/293 |
| 4,229,485 | 10/1980 | Brown et al. | 426/305 |
| 4,294,857 | 10/1981 | Fuller | 426/805 |
| 4,296,132 | 10/1981 | Lazarus et al. | 426/2 |
| 4,366,175 | 12/1982 | Brown et al. | 426/805 |
| 4,389,420 | 6/1983 | Yong et al. | 426/94 |
| 4,393,085 | 7/1983 | Spadlin et al. | 426/28 |
| 4,418,086 | 11/1983 | Marino et al. | 426/805 |
| 4,444,796 | 4/1984 | Ueno et al. | 426/335 |
| 4,508,741 | 4/1985 | Cobett | 426/303 |
| 4,702,926 | 10/1987 | Fowler | 426/283 |

FOREIGN PATENT DOCUMENTS

| | | |
|---|---|---|
| 473704 | 10/1937 | United Kingdom . |
| 1359901 | 7/1974 | United Kingdom . |
| 412772 | 11/1975 | United Kingdom . |
| 1433657 | 4/1976 | United Kingdom . |
| 1465267 | 2/1977 | United Kingdom . |

Primary Examiner—Donald E. Czaja
Assistant Examiner—Helen Pratt
Attorney, Agent, or Firm—Richard Kornutik

[57] ABSTRACT

A process of producing a biscuit with a baked-on proteinaceous coating, comprising steps of:
(a) preparing a dough piece from a dough comprising flour, meal, fat and water;
(b) enrobing the dough piece with a viscous coating formulation comprising 10 to 30 weight percent of a dextrin carrier, 10 to 50 weight percent of meat, 10 to 30 weight percent of a glazing agent, 1 to 5 weight percent of polysaccharide gum, 5 to 15 weight percent of a monosaccharide sugar, 5 to 15 weight percent of a disaccharide sugar, and water, all based upon total dry solids; and
(c) baking the dough piece to form a dry biscuit with a baked-on coating. The glazing agent can comprise a gelatin or a modified food starch, and the polysaccharide gum can be a xanthan gum. Biscuits produced by the process and a bakable proteinaceous coating formulation as employed in step (b) are disclosed and claimed.

51 Claims, 4 Drawing Sheets

COATED CANINE BISCUITS

BACKGROUND OF INVENTION

1. Field of the Invention

This invention relates generally to baked food products such as baked pet foods, and more particularly to coated canine biscuits, kibbles and the like.

2. Description of the Background Art

Pet foods are generally manufactured and available in dry, moist and semi-moist formulations. Moist pet foods, having a moisture content of about 50 percent or greater, are typically prepared from proteinaceous material such as meat, meat by-products or fish. Such high-moisture pet foods are usually very appealing to animals, but suffer from disadvantages including high production cost, high shipping weight and a potential for biological instability or spoilage, so that high-moisture pet foods are packaged in cans and must be consumed relatively soon after the containers are opened. Semi-moist products, which typically contain about 15 to 50 weight percent moisture, are formed from a combination of farinaceous materials, such as wheat or other grains, and proteinaceous material. These products also contain flavorings and moisture to improve palatability. However, semi-moist foods also suffer from potential biological instability, requiring sealed packaging such as sealed pouches, and such materials must also be consumed relatively soon after the container is opened.

Dry pet foods, which typically contain less than about 15 percent moisture, are formed primarily from farinaceous materials, and may contain small amounts of proteinaceous material and flavorings to improve palatability, as well as nutrients to insure a proper diet for the animal. While dry pet foods have excellent biological stability and can be packaged in bulk containers that need not be used immediately after opening, such dry pet foods also are often relatively low in palatability for the animal and low in perceived attraction to the consumer who purchases the product.

Several approaches for improving the palatability and consumer appeal of dry pet foods have been undertaken. In one, e.g., U.S. Pat. No. 3,119,691, the dry pet food is coated with gravy-forming ingredients, so that when water is added a thick gravy is formed. In another approach, a dry farinaceous core is covered with a coating of a moist proteinaceous material to mask the flavor and appearance of the core. Examples of this approach include U.S. Pat. No. 3,808,340, U.S. Pat. No. 3,615,647, British Pat. Nos. 1,389,578 and 1,465,267. Although they are attractive to consumers and the pets to which they are fed, such products also suffer from many of the disadvantages inherent in high-moisture products.

In yet another approach, as described in U.S. Pat. No. 4,229,485, a farinaceous core is covered with a coating of slurried liver, which is then dried upon the surface of the core to improve the flavor of the final product and to impart a sheen to the surface of the product, which is stated to be desirable to the consumer. In such liver-coated dry pet food products, it is then found necessary that the liver content should exceed about 50 weight percent of the coating so that the final dry product has the desired sheen. Although the liver coated dry pet food product described in U.S. Pat. No. 4,229,485 has proved successful commercially, it suffers from several disadvantages. The appearance of the product can vary from batch to batch due to variations in liver quality and minor processing variations. The relatively high liver content necessary to produce the desired sheen results in a high formulation cost, and a high production cost due to the relatively long drying times needed to reduce the moisture content of the coating to a level which will not support biological instability. Furthermore, the desirable surface sheen is obtained only with a coating containing a high proportion of liver, and not from any other possible proteinaceous ingredients. As described in such patent, the liver-containing coating is applied by immersing a hot baked biscuit in a meaty coating of farinaceous material and liver having a lower temperature, which is said to draw the coating material into the biscuit. The coated biscuit is then subjected to a second baking to form a hard crust of glazed-dried meaty substance on the exterior. U.S. Pat. No. 4,366,175 is a continuation-in-part of U.S. Pat. No. 4,229,485.

Various proteinaceous coatings and glazes are available for use on baked goods, including the glaze of U.S. Pat. No. 4,389,420, which is intended for use on refrigerated dough which is stored in containers prior to baking. The glaze contains between 4 and 25 weight percent of proteins such as gelatin, whey or casein, and has a viscosity above $10^5$ centipoise when measured at 5.5° C.

Still another approach is taken by U.S. Pat. No. 3,808,341, which describes a food product having a core of nutritious, edible, low cost materials having textures ranging from soft and gelatinous to firm, dry and crunchy (e.g., a biscuit), this core material being covered by a coating of an edible foodstuff of substantially higher palatability than that of the core. The coating is a proteinaceous coating such as a suspension or emulsion of materials comprising egg and milk proteins. The coating serves to seal in the flavors of the core material and acts a bonding medium for securing particulate flavor bits which are applied to the exterior, the bits comprising proteins such as precooked meat, poultry or fish.

Despite the many approaches which have been taken to enhancing consumer appeal and palatability of dry pet foods, there is still an apparent need for improved dry pet food such as canine biscuits with coatings applied thereto which will combine the nutrients and tooth-cleansing effects of a dry food or biscuit with the visual appeal, flavor and nutrients available in a proteinaceous coating. In particular, processes of improved efficiency and economy for producing coated canine biscuits are desired.

BROAD DESCRIPTION OF THE INVENTION

An object of the present invention is to provide pet biscuits of a hard, crisp or chewy texture with a glossy, flavorful and attractive coating which is moderately resistant to moisture, in contrast to the gravy-forming coatings utilized in certain dry pet foods. Another object of the invention is to incorporate a real meat flavor in a stable, glossy coating which can be applied to dry pet food such as biscuits. A further object of the present invention is an economical and efficient production process for preparing coated pet biscuits having a glossy coating which can be baked onto the surface without blistering. A still further object of the present invention is a proteinaceous coating for baking onto dry pet foods which adheres to a dough piece in a good thickness for good consumer appeal and flavor which is palatable to pets. Still another object of the present invention is a coating which is capable of suspending and carrying particles for application to the surface of a dry pet food such as a biscuit to simulate particles of meat in the finished product.

In accordance with the invention, a process of producing a biscuit with a baked-on proteinaceous coating is provided, comprising the steps of:

(a) preparing a dough piece from a dough comprising flour, meal, fat and water;

(b) enrobing the dough piece with a viscous coating formulation comprising from about 10 to about 30 weight percent of a dextrin carrier, from about 10 to about 50 weight percent of meat, from about 10 to about 30 weight percent of a glazing agent, from about 1 to about 5 weight percent of at least one polysaccharide gum, from about 5 to about 15 weight percent of a monosaccharide sugar, from about 5 to about 15 weight perent of a disaccharide sugar, and water, with the weight percentages being based upon total solids content and totaling about 100 weight percent; and (c) baking the coated dough piece to form a dry biscuit with a baked-on coating. In various embodiments the glazing agent can comprise at least one modified food starch as described below or at least one gelatin. The meat component can comprise at least one dehydrated meat such as a jerky. The polysaccharide gum preferably comprises a xanthan gum. In other embodiments, the dough can comprise particulate proteinaceous and/or farinaceous materials, and/or the coating formulation can comprise a particulate farinaceous texturizer.

Further in accordance with the invention, coated biscuits produced in accordance with the claimed processes are provided. In a preferred embodiment, a bone-shaped canine biscuit is provided which is baked from a dough comprising wheat flour, wheat meal, soybean meal, meat and bone meals, animal fat and water, having a baked-on glossy coating produced by a coating formulation comprising from about 15 to about 25 weight percent of a dextrin carrier, from about 20 to about 35 weight percent of at least one dehydrated meat in finely-divided form, from about 15 to about 25 weight percent of at least one modified food starch, from about 2.5 to about 3.5 weight percent of at least one polysaccharide gum, from about 7 to about 10 weight percent of a monosaccharide sugar, from about 7 to about 10 weight percent of a disaccharide sugar, and water, all based upon total solids in the formulation, wherein the coated biscuit has an overall moisture content of less than about 16 weight percent.

In a particular embodiment, the coated biscuit has at least one recessed area on the top surface area which retains the applied coating formulation and thus the baked-on coating, and has at least one identifying mark in raised letters or symbols within the recessed area, with the top surface of the mark being slightly lower than the top surface of the biscuit, but near enough to the surface of the retained coating that the mark is visible through the glossy, translucent baked-on coating.

Still further in accordance with the invention, a bakable proteinaceous coating formulation is provided which comprises from about 10 to about 30 weight percent of a dextrin carrier, from about 10 to about 50 weight percent of at least one dehydrated meat, from about 10 to about 30 weight percent of a glazing agent, from about 1 to about 5 weight percent of at least one polysaccharide gum and from about 5 to about 15 weight percent of a monosaccharide sugar, from about 5 to about 15 weight percent of a disaccharide sugar, and water, all based upon the total weight of solids. Although not wishing to be bound by theory it is believed that the ingredients including the dextrin carrier, the polysaccharide gum, the glazing agent and the monosaccharide and disaccharide sugars interact and cooperate to produce novel viscosity and baking characteristics. This coating formulation is a viscous, thixotropic composition which is pumpable and flowable and capable of suspending particulate materials therein and is sufficently viscous to adhere to a dough piece to form a coating of a desired thickness. The viscosity of the formulation has been found to be remarkably stable over broad temperature ranges, e.g., from 35° to 180° F. When baked onto a biscuit, the coating formulation produces a glossy, flavorful coating which is moderately resistant to moisture, thus providing a baked coated biscuit which is attractive to consumers, palatable to pets and stable in transit and storage.

Other objects, details and advantages of the present invention will be apparent from perusal of the following detailed description, the drawings and the appended claims.

DETAILED DESCRIPTION OF THE INVENTION

As described above, the present invention is directed to a process for preparing baked pet foods having a coating baked thereon, and products thus prepared. These products can be prepared in a variety of sizes and shapes ranging from kibbles or other bite size units through biscuits of various shapes and sizes, and can be prepared to suit the taste of most carnivorous or ominivorous domestic or pet animals. The invention is described herein primarily in terms of a coated bone-shaped canine biscuit, but this should not be takened to limit the scope of the invention, which is delineated by the appended claims. In contrast to the many coated canine biscuit products in the prior art, it has been found that a glossy, flavorful coating can be baked onto a biscuit by applying a single layer of a novel coating formulation to an unbaked dough piece and baking both biscuit and coating in a single baking stage.

The present invention includes biscuits or other baked dough products having a glossy, baked on coating which are of broad utility, but are presently of particular interest for pet foods such as canine biscuits.

Figure 1:
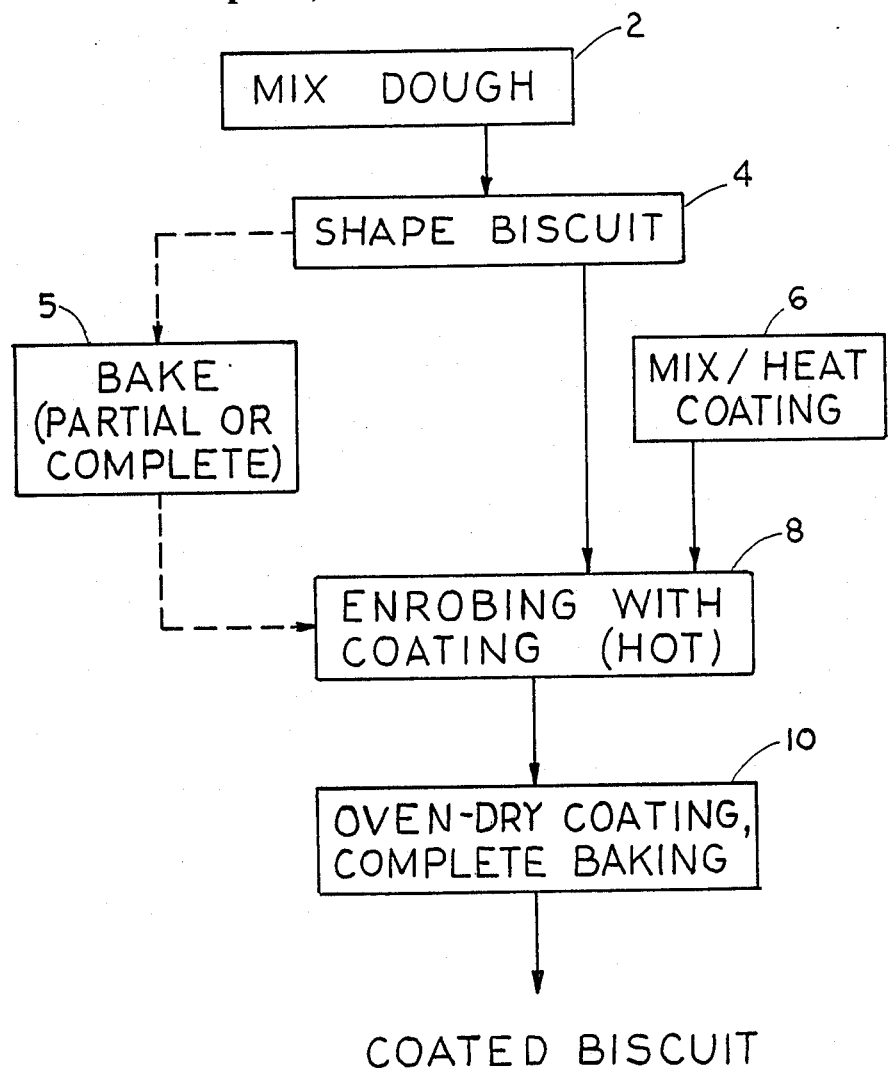
FIG. 1 is a block flow diagram of the process of the present invention.

Referring to FIG. 1, the process of the invention begins with mixing of the dough, which can be a conventional dough such as is used in baking canine biscuits or other desired products. Conventional mixing apparatus and processes can be used. Dough pieces are then formed by any suitable means such as extrusion, stamping, cutting or molding. For many products such as the bone shaped canine biscuits described herein as exemplary of the present invention, a rotary molding system is preferred because it permits the rapid forming of dough pieces with good control over their shape, form and surface characteristics. Docker holes are preferably formed in the dough piece during molding to facilitate the escape of moisture during baking, as shown in FIGS. 2 through 5. After shaping, the dough pieces can optionally be subjected to a baking stage at which they are at least partially baked. Preferably, however, the dough pieces are subjected to only one baking step after application of the coating, as this is more efficient and economical. Most prior art processes for the application of baked-on coatings to canine biscuits have required two baking steps. Surprisingly, it has been found that the coating formulations of the present invention can be baked in a single step on a dough piece to form a glossy coating essentially free of blistering or other surface imperfections.

A coating formulation as described below is mixed and heated to a desired application temperature and applied to the dough pieces, uncooked or partially baked, in a manner which provides an essentially complete coating on at least the upper surfaces and sides of the dough piece. Preferably, conventional enrobing apparatus and methods are utilized. Although enrobing systems can be devised to coat all surfaces of the dough piece, the bottom surface is customarily left substantially uncoated to facilitate movement and baking on conveyor belts and other transport equipment. To provide a smooth, even coating on the dough pieces, air blowing systems such as are used in chocolate enrobing can be employed. The coated dough pieces then pass to an oven such as a conventional band oven where the coating is at least partially dried, the biscuit is baked and the coating becomes a glossy, baked-on coating for the baked dough piece or biscuit. The conveyer belts of the oven can be coated with an edible lubricant such as a natural or synthetic cooking oil or shortening to facilitate separation from the conveyer belts of the baked products. Temperatures in the range of about 350° to about 600° F. can be used. The baked, coated biscuits can also be subjected to a subsequent baking or drying step, at temperatures of about 200° to 400° F., either within the baking oven or separately, to produce the desired moisture content in the final product.

Any suitable dough comprising at least one flour, meal, fat and water can be employed for the baked product desired; for instance, when the desired product is a canine biscuit, a conventional dough for dog biscuits can be used, optionally containing discrete particles of meat and/or meat byproducts or farinaceous material. Such doughs typically contain fat solids. Examples of suitable doughs for the production of hard dog biscuits are disclosed in U.S. Pat. No. 4,454,163, and suitable doughs for the production of soft dog biscuits (containing humectant to control water activity) are disclosed in U.S. Pat. No. 4,454,164. Those patents are incorporated herein by reference in their entirety. Suitable doughs and biscuit shapes are also disclosed in U.S. patent application Ser. No. (000,431) filed simultaneously herewith. Particulate proteinaceous particles such as particles of meat can be incorporated to add flavor to the biscuits and texturize the surface. Particulate farinaceous materials such as bran particles can also be employed to texturize the surface of the biscuits and to provide other useful properties to the product. A dough found to produce biscuits highly palatable to dogs includes suitable proportions of wheat flour, wheat meal, soybean meal, meat and bone meal, animal fat and natural flavors in admixture with water. The meal used in the doughs suitable for production of biscuits useful in the present invention can comprise meat and/or bone as defined herein, and/or vegetable matter including farinaceous materials, materials prepared from legumes such as beans and peas, tuberous materials such as potato meal, and the like. The meals can be finely or coarsely ground as desired for the texture. Flours made from any suitable farinaceous materials can be used.

The coating formulations of the present invention when baked onto a dough piece to form a coated biscuit provide products which are both attractive to consumers and palatable to the pets to which they are fed. Indeed, coating formulations within the scope of those claimed herein can be used in the preparation of baked snack foods for human consumption as well, for example biscuits, crackers, pretzels, food bars and the like. A glossy coating which enhances appearance, flavor, protein content and moisture resistance is very desirable in such products. Color is normally employed in the formulation to give the baked product a meaty appearance, increasing consumer eye appeal. The coating formulation must be pumpable and flowable to permit application with typical enrobing apparatus and processes, but should be viscous, i.e., should regain sufficient viscosity upon application to be retained as a suitably thick coating on the dough piece so that it forms the desired glossy baked-on coating. The formulation should also have sufficient suspending ability to suspend particulate matter which may be incorporated in the coatings to add a surface texture to the finished product. Accordingly, the coating formulation must be thixotropic or nearly pseudoplastic. A pseudoplastic solution or composition exhibits a sharp reduction in viscosity upon the application of shear, as in mixing or pumping, thereafter abruptly regaining the original viscosity when the shear effects of pumping or processing are removed. Such ideal properties are rarely attained, but for the purposes of the present invention it is sufficient that the formulation be thixotropic, that is undergoing a reduction in viscosity after a finite time delay when shear is applied to the material, thereafter regaining essentially the original viscosity when the shear force is removed, with another finite time delay. Preferably the formulation as applied retains a substantial proportion of its viscosity during baking, to prevent excessive dripping or runoff. It is desirable that the formulation as applied to the dough piece flows sufficiently to cover essentially the entire surface of the dough piece, thereafter regaining sufficient viscosity to remain in place as a coating of sufficient thickness on the dough piece. As mentioned above, air blowing systems can be used to aid such flow. By the inclusion of a substantial amount of meat, and, optionally, other flavors, the formulation provides a coating having a desirable flavor and color as described above. The recited ingredients of the formulation are combined in proportions which allows the formulation to bake to a glossy, moisture-resistant finish without blistering during the baking process.

The dextrin carrier and modified food starch or gelatin glazing agent cooperate to produce a glossy, moderately moisture-resistant baked-on coating. The dextrin can broadly be present as about 10 to 40 weight percent, preferably from about 10 to about 30 weight percent, and most preferably from about 15 to 25 weight percent, based on the total weight of dry solids. The proportion of dextrin can be greater or less within these ranges, depending upon the proportions of modified food starch or gelatin used. The glazing agent (modified food starch or gelatin) can be present as an amount in the range of from about 10 to about 30 weight percent, preferably from about 15 to about 25 weight percent, based on the total weight of dry solids. Meat is present in the formulation for flavor and nutrition purposes as from about 10 to about 50 weight percent, preferably from about 15 to about 40 weight percent, and most preferably from about 20 to about 35 weight percent, based on the total weight of dry solids. The type and proportions of meat are preferably selected to maximize the flavor appeal and nutrition obtained for a unit product cost. Although small proportions of fats or oils can be included in the coating formulation to produce a glossier, more resilient baked coating, the preferred formulations are substantially free of fats and oils, as the baked coatings produced therefrom are more moisture-resistant.

The polysaccharide gum has the most significant effect on the formulation,s viscosity (imparting pseudoplasticity and temperature stability) and can be present in amounts in the range of from about 1 to about 5 weight percent, preferably from about 2 to about 4, and most preferably from about 2.5 to about 3.5 weight percent, based on the total weight of dry solids.

Two sugars are included, preferably comprising at least one monosaccharide sugar such as dextrose and at least one disaccharide sugar such as sucrose. Each component can be present as an amount in the range of from about 5 to about 15 weight percent of the total solids, preferably from about 7 to about 10 weight percent, based on the total weight of dry solids. The combination of sugars contributes to browning of the baked coating and flavor, as well as flowability and bacteriostasis in the formulation.

Depending upon the viscosity characteristics of the formulation ingredients, the dry solids can be combined with water in proportions such that the total solids are in the range of from about 10 to about 20, preferably from about 12 to about 18 weight percent, based on the total weight of the mixture.

The dextrin carrier employed in the formulation can be any suitable dextrin product useful in the food industry, such as the AMAIZO LO-DEX® malto-dextrin products marketed by the American Maize-Products Company of Hammond, Indiana. These are low dextrose equivalent malto-dextrin products produced by hydrolyzing corn starch. AMAIZO LO-DEX® 10 has been found to give satisfactory results in formulations of the present invention. Various partially-hydrolyzed food starches which have similar viscosity characteristics can also be used. The dextrin acts as a carrier as well as aiding in viscosity control and adhesion of the coating.

Another ingredient of the coating formulation is a substantial quantity of meat in a finely divided, particulate or slurried form, which can encompass any of the meats or meat byproducts obtained from mammals, fish, or fowl which have been described as useful in the pet food industry. Preferably a dehydrated meat is employed, as the drying and curing processes used reduce the probability of spoilage during processing or subsequent storage and transportation. The quantity of water used in the formulation should be adjusted according to whether fresh or dehydrated meats are used. Most preferably, a meat jerky product such as beef jerky is employed, as the spicy flavorings of such products enhance the palatability of the coated biscuit for the pet and produce an aroma which is more pleasing to the consumer purchasing the coated biscuit product. Such a dehydrated meat in finely divided form (e.g., passing a 14 mesh, or preferably 20 mesh sieve) is preferably used to form a smooth and continuous coating on the dough piece, but if desired at least a portion of the meat (such as beef jerky) can be in larger particulate form (e.g., passing an 8 to 14 mesh sieve and retained by a 30 mesh sieve), which also provides a desirable rough surface texture to the coating. However, under the baking conditions usually employed such meat particles in the coating will tend to scorch, requiring adjustment in baking time and/or temperature. If desired, small proportions of organ meats such as heart, liver or kidney can be included to enhance flavor, but substantial quantities of liver are preferably avoided due to the relatively high cost. An object is to obtain the most palatable flavor for the pet while retaining consumer appeal at a relatively low unit cost.

As a glazing agent, at least one modified food starch or at least one gelatin can be applied. The glazing agent is used in a type and quantity effective to produce a glossy or glazed coating having a moist, glossy appearance and having some resiliency. Any suitable gelatin product approved for use in the pet food industry can be employed, such as animal gelatin, egg albumen and the like. It is presently preferred to use a modified food starch as the glazing agent, encompassing any suitable food starch which has been modified by at least partial hydrolysis and/or chemical modifications so that it produces a glossy film when applied to a surface in a heated formulation of the type described in the present invention. Suitable water-soluble starch polymers can be derived from starches such as corn, potato and tapioca by processes including acetylation, chlorination, acid hydrolysis, enzymatic action, oxidization (with sodium hypochlorite or the like), or the introduction of carboxyl, sulfate or sulfonate groups. Such starches can be crosslinked with suitable agents to increase the viscosity and thickening power. Particularly preferred are modified waxy maize starches, such as MIRA-CAP® starch, available from A. E. Staley Manufacturing Company of Decatur, IL; Film Set®, available from the National Starch & Chemical Corp. of Bridgewater, NJ, and various products available from the American Maize-Products Company, including AMAIZO POLAR-GEL® 8 and 10, X-TRA GEL® 7 and AMIOGUM® 688 starch. -

An effective amount of at least one polysaccharide gum, preferably a gum which will produce an essentially pseudoplastic solution, is included in the formulation as the primary agent to produce the desired viscosity characteristics. Generally an amount in the range of from about 1 to about 5 percent, based on the total solids will be effective. Any suitable vegetable gum can be used which will produce thixotropic or pseudoplastic formulations, including the various natural (e.g., guar gum, gum arabic and the like) and synthetic food gums. Particularly preferred is a xanthan gum, a natural biopolysaccharide produced by microorganisms. Xanthan gum solutions exhibit nearly pseudoplastic rheology, permitting a relatively small amount of the gum to be effective in producing viscosity characteristics in a formulation such as described herein which is thixotropic or approaches pseudoplasticity. In addition, the viscosities of xanthan gum solutions are remarkably stable over a wide range of temperatures, and relatively unaffected by varying pH and varying concentrations of salts in the solution. In addition to varying the concentration of a xanthan gum or other vegetable gum present in the formulation to affect the viscosity and rheology properties, blends of two or more gums can be employed to produce the desired characteristics. For example, the degree of pseudoplasticity of a xanthan gum can be reduced by adding an alginate salt such as sodium alginate. Because of its yield value and a viscosity which is almost independent of temperature and pH, xanthan gum is regarded as nearly ideal as a suspension stabilizer, and thus is particularly useful in the formulations of the present invention when particulate matter is to be suspended in the coating. Xanthan gums are available commercially from the Kelco Co., San Diego, Calif., under the trade names KELTROL ® (food grade) and KELZAN ® (industrial grade). Other useful gums include guar gum.

Contributing further to the flavor and viscosity characteristics of the formulation and the glossiness of the baked coating is a blend of sugars, preferably comprising sucrose disaccharide and dextrose monosaccharide. The monosaccharide is believed to contribute to browning of the coating and the disaccharide is believed to contribute to flowability, while both sugars aid in bacteriostasis in the formulation.

Figure 2:
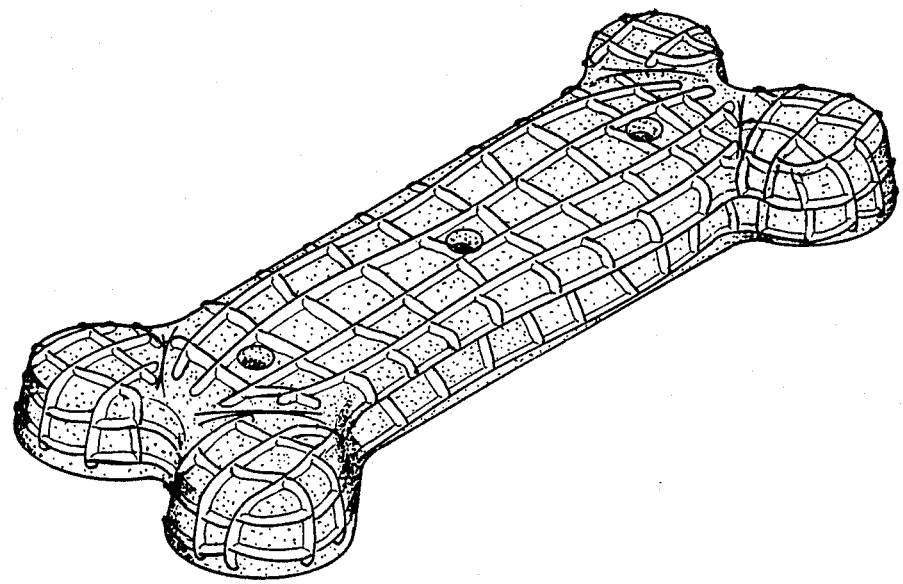
FIG. 2 is a perspective view of a bone-shaped canine biscuit molded with a surface containing irregularities.
Figure 3:
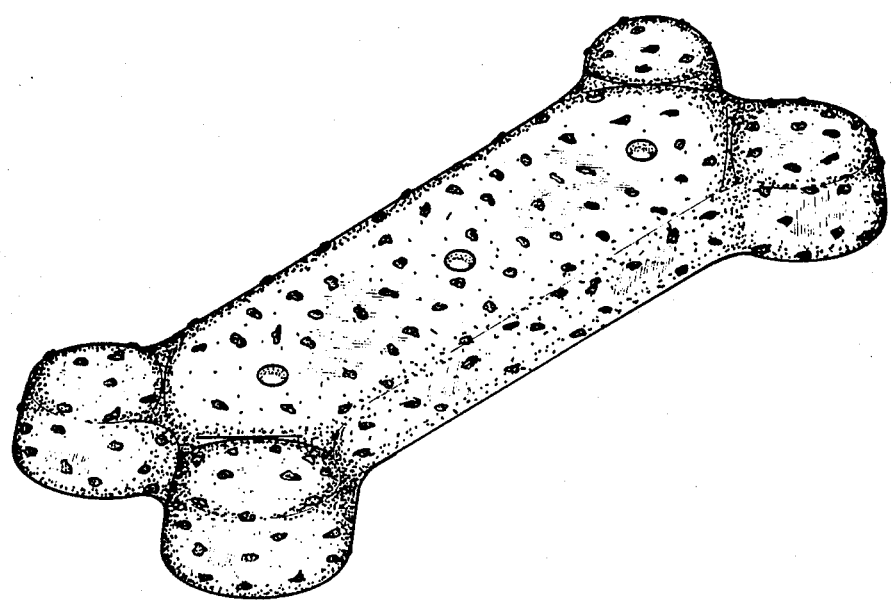
FIG. 3 is a perspective view of a bone-shaped canine biscuit having a baked-on coating of the invention which contains particulate matter.

In preferred embodiments such as shown in FIG. 3, particulate farinaceous texturizers are included in the coating formulation to provide an attractive surface roughness simulating the presence of fragments of meat on bone-shaped coated biscuits and at the same time to provide desirable food components. The term "bone-shaped" signifies the typical shape of canine biscuits, having a shank and rounded, broader knobs at the ends suggesting the ball or socket of certain bones. Typical examples are shown in FIGS. 2 through 5. Such shapes are known in the art to be convenient for canines to chew and eat. Any suitable particulate farinaceous matter can be employed, preferably those materials which provide nutrients and/or desirable bulk product properties to the product. Preferred materials include raw bran, cracked whole grains such as cracked wheat and "rye chops" and ground hard biscuit materials such as waste or excess baked biscuits of the type to which the coating is to be applied. If desired, farinaceous materials which preferentially absorb the colors employed in the coating formulation can be used so that they are more noticeable in the baked coating on the surface of the product. The particulate farinaceous materials can be employed in any suitable size range, providing the particles are large enough to be observed visually and/or tactilely, but not so large as to readily rub off the finished products during transportation, storage or use or to impede the flow of the coating formulation through the enrobing apparatus. Particles which will pass an 8 mesh sieve or preferably a 14 mesh sieve, and be retained by a 30 mesh sieve are preferred. With some apparatus, it may be necessary to provide slots or grooves in applicator wheels, rollers, coating rolls or other processing equipment if the formulation must pass through a narrow channel.

Indicative of the viscosity characteristics of the formulations of the present invention is that when measured with the Brookfield Model RV viscometer using a No.3 spindle at 10 rpm, viscosities of less than $10^6$ centipoise, and preferably less than 105 centipoise, are attainable at temperatures of 5.5° C. (about 42° F.). The coating formulations including a substantial quantity of gelatin typically have been found to attain viscosities between $10^5$ and $10^6$ centipoise, while the formulations employing a modified food starch as the glazing agent readily attain viscosities of less than $10^5$ centipoise. The formulations also can attain viscosities of less than about 3,000 centipoise at 120° F. and less than about 2,000 centipoise at 180° F. when tested with the same equipment. Measured at 170° F. with a 15 second flow time, the formulations can also have viscosities in the range of 14 to 18 Bostwick units.

Rotary molding can be used to emboss or impress a regular or random pattern of indentations or irregularities in the molded surface of the dough piece, which aids in retention of the coating formulation on the surface after application. For example, FIG. 2 illustrates a biscuit imprinted with a random network or "peanut hull" pattern. A similar pattern is used in "NUTTER BUTTER ®" cookies, marketed by applicants' assignee, Nabisco Brands, Inc. The retention of increased quantities of the coating formulation can enhance the biscuit's visual appeal and palatability. The inclusion of such irregular pattern in the mold also facilitates the separation of the molded dough piece.

Figure 4:
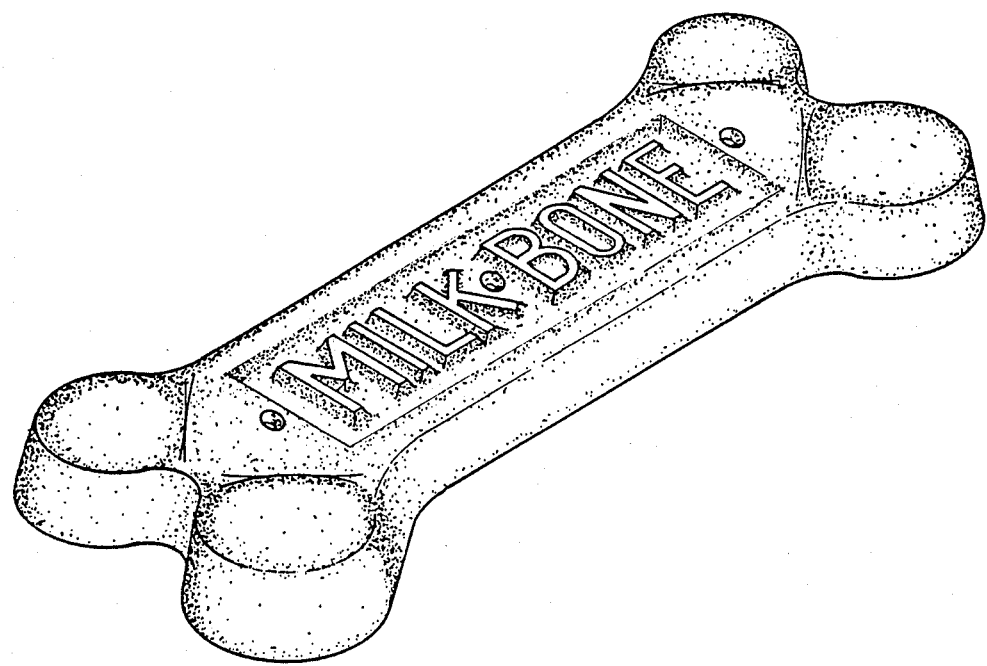
FIG. 4 is a perspective view of a bone-shaped canine biscuit having a recess in the top surface area which contains raised letters spelling "MILK BONE" and FIG. 5 is a perspective view of the biscuit of FIG. 4 to which a coating of the invention has been applied to cover the surface and fill the recess.
Figure 5:
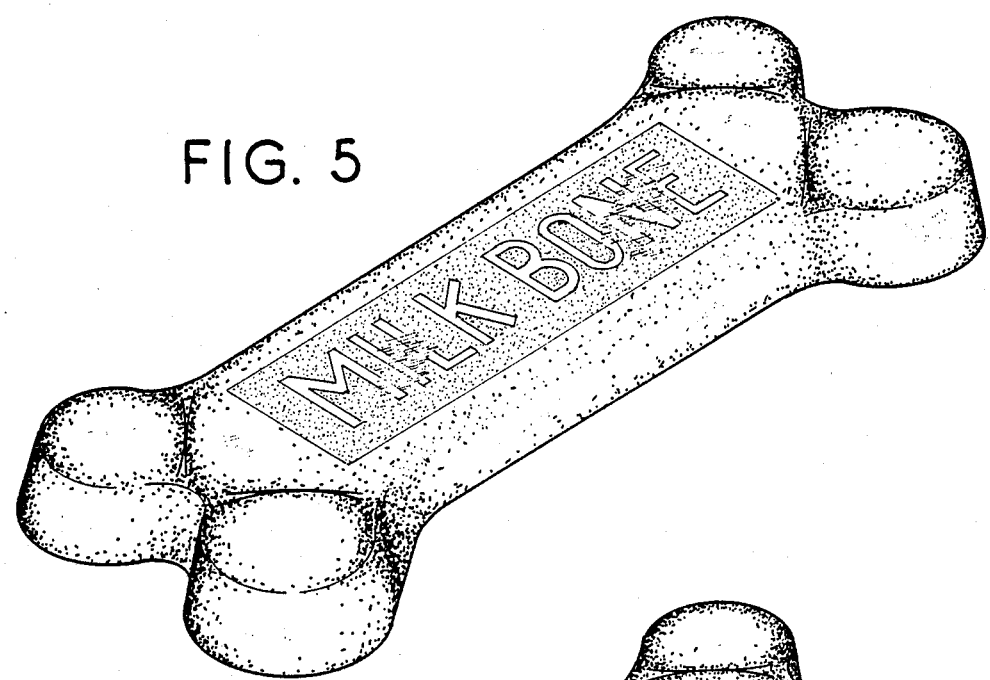
Figure 6:
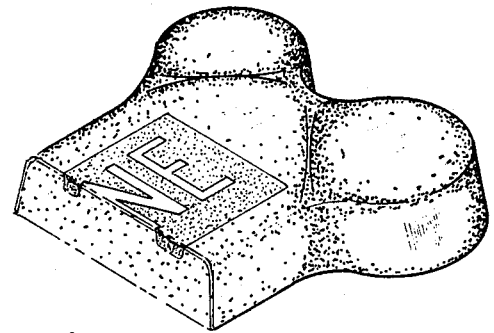
FIG. 6 is a sectional view of the biscuit of FIG. 5 illustrating the use of the coating to fill the recess and cover the surface of the raised letters.

In certain embodiments, a dough piece can have a recess or depression molded in the top surface thereof to hold a quantity of the coating formulation and/or a flavored filling in the finished biscuit. Such a biscuit is shown in FIG. 4, with raised letters within the recess spelling out a trade name. In FIG. 5, this biscuit is shown in a form in which the recess has been filled with the coating formulation and/or a filling, with the coating baked over the entire surface so that the letters of the trade name are visible through the glossy translucent colored coating. The filling used in addition to the coating can be any flavorful, nutritious coating which can maintain the desired moisture content and water level equilibria within the finished baked biscuit, but is preferably a gelatinous, translucent colored material which enhances the appearance of the coated biscuit. Such products have high visual appeal for consumers and high palatability for pets.

The coated dough pieces are baked as described above to an overall moisture content of less than about 16 weight percent for a soft or chewy biscuit, or less than about 12 weight percent for a hard biscuit. Further baking and/or drying steps can be employed to reduce the moisture content below that attained in the initial baking step.

The invention is illustrated by the following non-limiting examples:

EXAMPLES

Doughs for a hard canine biscuit were prepared using commercial mixing equipment and the formula of TABLE I.

TABLE I

| Ingredient | Weight (lbs) |
|---|---|
| Wheat flour | 940 |
| Soybean meal | 135 |
| Meat and bone meals | 100 |

TABLE I-continued

| Ingredient | Weight (lbs) |
| --- | --- |
| Wheat meal | 40 |
| Animal fat (with preservative) | 32 |
| Natural flavors | 21 |
| Vitamin & mineral preblend | 25 |
| Water (warm tap water, 100°–140° F.) | 500 |
| Total ingredients | 1,793 |

For all of the examples, the doughs were mixed to a suitable consistency for rotary molding and molded into bone-shaped canine biscuits about 4 inches in length using a rotary molder. In the preliminary trials some of the biscuits were partially baked before application of the coating formulation, but in the examples below, the coating formulations were applied directly to the uncooked dough pieces as molded, which is preferred for reasons of economy and efficiency. In each trial, a coating formulation was heated to about 180° F. and applied to the raw dough pieces using commercial enrobing equipment. The enrobing system provided a curtain of the flowing formulation through which the dough pieces passed, with an air blowing system controlling the flow of the formulation as applied to the pieces. The excess formulation which ran off after enrobing of the biscuits was recycled for use on subsequent applications. Numbered examples are indicated in TABLES II and III below for various formulations which were tested.

TABLE II

| | Example/Trial No. Weight percent[1] | | |
| --- | --- | --- | --- |
| | 1 | 3 | 4 |
| Dextrin[2] | 23.5 | 23.5 | 35.5 |
| Food Starch, Modified[3] | — | 23.5 | — |
| Beef Jerky powder | 30.0 | 30.0 | 30.0 |
| Flavorant | 0.6 | 0.6 | 0.6 |
| Polysaccharide gum[4] | 4.0 | 4.0 | 4.0 |
| Food colors | 0.74 | 0.74 | 0.74 |
| Monosaccharide (dextrose) | 8.83 | 8.83 | 8.83 |
| Disaccharide (sucrose) | 8.83 | 8.83 | 8.83 |
| Gelatin[5] | 23.5 | — | 11.5 |

Notes:
[1]Approximate weight percent, based upon total solids. Tap water was added as approximately 85 weight percent of the total mixture to produce a solution/suspension having the desired viscosity characteristics.
[2]AMAIZO LO-DEX ® 10, a powdered malto-dextrin product produced hydrolysis of corn starch and having a low dextrose equivalent (approximately 11). Obtained from American Maize-Products Co., Corn Processing Div., 1100 Indianapolis Blvd., Hammond, Indiana 46320.
[3]Example 2 used Film Set ® starch, a modified food starch available from the National Starch & Chemical Corp., of Bridgewater, NJ; Example 3 used MIRA-CAP ® Starch, a modified waxy corn starch obtained from A. E. Staley Industrial Products, 2200 East Eldorado St., Decatur, IL 62525.
[4]KELTROL ®, a food grade xanthan gum obtained from the Kelco Co., San Diego, CA.
[5]A commercial 250 bloom animal gelatin.

TABLE III

| | Example/Trial No. WEIGHT PERCENT[1] | | |
| --- | --- | --- | --- |
| INGREDIENTS: | 5 | 6 | 7 |
| Dextrin[1] | 20.0 | 20.0 | 20.0 |
| Food Starch, modified[1] | 20.0 | 20.0 | 20.0 |
| Beef Jerky powder | 30.0 | 30.0 | 30.0 |
| Flavorant | 0.6 | 0.6 | 0.6 |
| Polysaccharide gum[1] | 3.3 | 3.3 | 3.3 |
| Food colors | 1.1 | 1.1 | 1.1 |
| Monosaccharide (dextrose) | 7.5 | 7.5 | 7.5 |
| Disaccharide (sucrose) | 7.5 | 7.5 | 7.5 |
| Raw Wheat Bran | 10.0 | — | — |
| Rye Chops | — | 10.0 | — |
| Ground Dog Biscuit[2] | — | — | 10.0 |

Notes:
[1]Footnotes 1 to 4 of TABLE II apply; MIRA-CAP ® was used as the modified food starch.
[2]Finely ground biscuits prepared from the formula of TABLE I.

The coating formulations were heated and applied with commercial enrobing equipment at a temperature of approximately 180° F. the formulations are preferably applied hot to fully develop the film-forming properties of the modified food starches used and to restrict bio-growth. Although the application temperature can be in the range of about 150° to 200° F., the preferred temperature range is from about 170° to 185° F. In applying the formulations to bone-shaped biscuits which were essentially flat, it was found that the formulations tended not to adhere completely to the side surfaces. In later trials with biscuits which were molded with a more rounded shape, it was found that the formulation flowed off the top onto the sides to produce a substantially even coating. Thus, to produce the most even coating possible on top and side surfaces of the biscuit, the radius of curvature of the edges should be as large as possible, for example at least about 0.25 inch in a bone-shaped biscuit about 4 inches long with a shank about 1 inch wide. Additionally, the sides of the biscuit slope downward at angles in the range of approximately 75 to 85 degrees. These features also facilitate separation of the molded dough pieces from the mold. Generally, a coating of approximately tissue thickness was obtained. To provide good coverage of the biscuit for maximum consumer eye appeal and palatability, the coating should be at least about tissue thick as applied, and preferably in the range of from about tissue to index card thickness. If the coating is too thick, it may interfere with the loss of moisture during baking and/or drying, and the baked coating may be brittle or vulnerable to flaking or fracture during the operations from production to consumer, diminishing the perceived value of the product.

A sample of formulation no. 3 containing MIRA-CAP ® modified food starch was tested for viscosity properties using a Broookfield Model RV viscometer with a No. 3 spindle operating at 10 rpm. The values obtained at various temperatures are shown in TABLE IVA.

TABLE IVA

| Temperature, °F. | 35° | 50° | 70° | 80° | 100° | 110° | 180° |
| --- | --- | --- | --- | --- | --- | --- | --- |
| Visc., Cent. | 4000 | 4350 | 4050 | 3600 | 3550 | 2950 | 1800 |

A sample of formulation No. 1 containing gelatin was tested in the same manner, except that a No. 7 spindle was used at 68° F. and a No. 5 spindle at 77° F., each operating at 20 rpm. The viscosity values obtained at various temperatures are shown in TABLE IVB.

TABLE IVB

| Temperature, °F. | 68[1] | 77[2] | 110° | 180° |
| --- | --- | --- | --- | --- |
| Viscosity, Centipoise | 10,000 | 7200 | 3400 | 1100 |

Notes:
[1]Formulation gelled and became non-fluid.
[2]Formulation began to set.

It can be seen that the viscosities of the formulations are fairly stable over a broad range of temperatures, apparently due largely to the properties of the xanthan gum used as the principal viscosifier. With the formulations tested, those containing the modified food starch in place of gelatin maintained a more stable viscosity.

The coated dough pieces were baked for ten minutes in a band oven having the temperature settings in various zones indicated in TABLE V:

TABLE V

| Zone | 1 | 2 | 3 | 4 | 5 | 6 | 7 | 8 | 9 |
|---|---|---|---|---|---|---|---|---|---|
| Temperature, °F. | 530° | 530° | 550° | 540° | 400° | 520° | OFF | OFF | OFF |

The coatings containing the modified food starch as glazing agent baked into a smooth, glossy coating having a translucent character, without significant bubbling or blistering. On the other hand, trials 1 and 4 with formulations containing gelatin as the glazing agent produced baked coatings with discontinuities. Thus, the formulations relying upon modified food starches as the glazing agent are presently preferred. The baking step was followed with a drying step of about 15 minutes at 250° F. in a band dryer. The biscuits were baked to a moisture content of about 12 weight percent for a hard canine biscuit, with the drying step reducing the moisture content further to below 10 weight percent.

Coatings were applied using colors of brown, reddish-brown and a combination of discrete color units of brown, red and orange. Using focus group tests, coatings of these colors presented as representing cooked or raw meat products were all found to have acceptable consumer eye appeal. The baked, dried biscuits were tested by immersion in water and the coating was found not to form a gravy or emulsion, but to withstand the effects of water for a few minutes until the biscuit became saturated and crumbly. In canine palatability preference tests using a split-plate treat method, the coated biscuits produced were found to be at least as palatable as commercially available coated dog biscuits.

The improved baked goods of the present invention are capable of achieving the above-enumerated advantages, and while preferred embodiments of the invention have been disclosed, it will be understood that it is not limited thereto but can be otherwise embodied within the scope of the following claims.

We claim:

1. Process of producing a biscuit with a baked-on proteinaceous coating, comprising steps of:
   (a) preparing a dough piece from a dough comprising flour, meal, fat and water;
   (b) enrobing said dough piece with a viscous coating formulation comprising from about 10 to about 30 weight percent of a dextrin carrier, from about 10 to about 50 weight percent of meat, from about 10 to about 30 weight percent of a glazing agent, from about 1 to about 5 weight percent of at least one polysaccharide gum, from about 5 to about 15 weight percent of a monosaccharide sugar, from about 5 to about 15 weight percent of a disaccharide sugar, and water, wherein said weight percentages are based upon total solids content and total 100 weight percent; and
   (c) baking the coated dough piece to form a dry biscuit with a baked-on coating.

2. The process in accordance with claim 1 wherein said glazing agent comprises at least one modified food starch.

3. The process in accordance with claim 2 wherein said modified food starch is selected from the group consisting of starches which have been treated to improve their film-forming and gloss-forming properties by at least one process selected from the group consisting of partial hydrolysis and chemical modification.

4. The process in accordance with claim 1 wherein said glazing agent comprises at least one gelatin.

5. The process in accordance with claim 1 wherein said meat comprises at least one dehydrated meat.

6. The process in accordance with claim 5 wherein said dehydrated meat comprises a jerky.

7. The process in accordance with claim 1 wherein said polysaccharide gum comprises a xanthan gum.

8. The process in accordance with claim 1 wherein said disaccharide sugar comprises sucrose disaccharide and said monosaccharide sugar comprises dextrose monosaccharide, each as from about 7 to about 10 weight percent of said coating formulation.

9. The process in accordance with claim 1 wherein said dough further comprises particulate farinaceous or proteinaceous material.

10. The process in accordance with claim 1 wherein said coating formulation further comprises a particulate farinaceous texturizer.

11. The process in accordance with claim 10 wherein said particulate farinaceous texturizer comprises at least one material selected from the group consisting of raw bran, cracked whole grain and ground hard biscuit materials.

12. The process in accordance with claim 1 wherein said coating formulation is a thixotropic composition which is pumpable and flowable yet capable of suspending particulate material therein and adhering to said dough piece to form a coating of a desired thickness.

13. The process in accordance with claim 1 wherein said coating formulation has a viscosity of less than $10^6$ centipoise at 5.5° C.

14. The process in accordance with claim 1 wherein said coating formulation has a viscosity of less than $10^5$ centipoise at 5.5° C.

15. The process in accordance with claim 1 wherein said dough piece is partially baked before the application of said coating formulation.

16. The process in accordance with claim 1 wherein said dough comprises wheat flour, wheat meal, soybean meal, meat and bone meals and animal fat.

17. The process in accordance with claim 1 wherein said biscuit is baked to a moisture content of less than about 16 weight percent.

18. The process in accordance with claim 16 wherein said biscuit is baked to a moisture content of less than about 12 weight percent.

19. The process in accordance with claim 1 wherein said dough piece is molded with a rotary molder.

20. The process in accordance with claim 1 wherein said dough piece is molded and baked to form a bone-shaped biscuit.

21. The process in accordance with claim 1 wherein said dough piece is formed to include at least one recessed area on the top surface thereof which retains said coating formulation when applied.

22. The process in accordance with claim 20 wherein said dough piece is molded with rounded edges which tend to allow the flow of said coating formulation from the top surfaces over the side surfaces of said dough piece to produce a substantially even coating.

23. The process in accordance with claim 1 wherein said dough piece is molded with a pattern of surface irregularities on the entire molded surface thereof which tend to retain said coating formulation when applied.

24. The process in accordance with claim 1 wherein said coating formulation is applied hot.

25. The process in accordance with claim 1 wherein said coating formulation has a temperature in the range of from about 150° to about 200° F. when applied.

26. The process in accordance with claim 25 wherein the temperature of said coating formulation when applied is in the range of from about 170° to about 185° F.

27. The process in accordance with claim 1 wherein said coating formulation further comprises at least one food color selected from the group consisting of red, brown and orange.

28. The process in accordance with claim 1 wherein said baked-on coating has a glossy, translucent appearance.

29. A coated biscuit produced in accordance with the process of claim 1.

30. A coated biscuit produced in accordance with the process of claim 2.

31. A coated biscuit produced in accordance with the process of claim 10.

32. A bone-shaped canine biscuit baked from a dough comprising wheat flour, wheat meal, soybean meal, meat and bone meals, animal fat and water, having a baked-on glossy coating produced by a coating formulation comprising from about 15 to about 25 weight percent of a dextrin carrier, from about 20 to about 35 weight percent of at least one dehydrated meat in particulate form, from about 5 to about 25 weight percent of at least one modified food starch, from about 2.5 to about 3.5 weight percent of at least one polysaccharide gum, from about 7 to about 10 weight percent of a monosaccharide sugar, from about 7 to about 10 weight percent of a disaccharide sugar, and water, all based upon total solids in said formulation, wherein the coated biscuit has an overall moisture content of less than about 16 weight percent.

33. The coated biscuit in accordance with claim 32 wherein said coating formulation further comprises a particulate farinaceous texturizer.

34. The coated biscuit in accordance with claim 32 wherein said dehydrated meat comprises at least one jerky.

35. The coated biscuit in accordance with claim 32 wherein said biscuit is formed with at least one recessed area on the top surface thereof to retain said coating.

36. The coated biscuit in accordance with claim 35 wherein said recessed area contains at least one raised identifying mark selected from the group consisting of raised letters and other symbols, the top surface of said mark being lower than the top surface of said biscuit.

37. The coated biscuit in accordance with claim 32 wherein said biscuit is formed with surface irregularities which tend to retain said coating when applied.

38. A bakable proteinaceous coating formulation comprising from about 10 to about 30 weight percent of a dextrin carrier, from about 10 to about 50 weight percent of at least one dehydrated meat, from about 10 to about 30 weight percent of a glazing agent, from about 1 to about 5 weight percent of at least one polysaccharide gum, from about 5 to about 15 weight percent of a monosaccharide sugar, from about 5 to 15 weight percent of a disaccharide sugar, and water, all based upon the total weight of solids.

39. The coating formulation in accordance with claim 38 wherein said glazing agent comprises at least one gelatin.

40. The coating formulation in accordance with claim 38 wherein said glazing agent comprises at least one modified food starch.

41. The coating formulation in accordance with claim 40 wherein said modified food starch is selected from the group consisting of starches which have been treated to improve their film-forming and gloss-forming properties by at least one process selected from the group consisting of partial hydrolysis and chemical modification.

42. The coating formulation in accordance with claim 38 wherein said dehydrated meat comprises at least one jerky.

43. The coating formulation in accordance with claim 38 wherein said polysaccharide gum comprises at least one xanthan gum.

44. A coating formulation in accordance with claim 38 wherein said disaccharide sugar comprises sucrose disaccharide and said monosaccharide sugar comprises dextrose monosaccharide.

45. The coating formulation in accordance with claim 38, which formulation is a thixotropic composition which is pumpable and flowable yet capable of suspending particulate materials therein and is sufficiently viscous to adhere to a dough piece to form a coating of a desired thickness.

46. The coating formulation in accordance with claim 38 which has a Brookfield viscosity of less than $10^6$ centipoise at 5.5° C.

47. The coating formulation in accordance with claim 38 which has a Brookfield viscosity of less than $10^5$ centipoise at 5.5° C.

48. The coating formulation in accordance with claim 40 which has a Brookfield viscosity of at least about 1800 centipoise at 180° C.

49. The process in accordance with claim 1 wherein said dextrin carrier is a low dextrose equivalent malto-dextrin or a partially-hydrolyzed food starch having suitable viscosity characteristics.

50. The coated biscuit in accordance with claim 32 wherein said dextrin carrier is a low dextrose equivalent malto-dextrin or a partially-hydrolyzed food starch having suitable viscosity characteristics.

51. The coating formulation in accordance with claim 38 wherein said dextrin carrier is a low dextrose equivalent malto-dextrin or a partially-hydrolyzed food starch having suitable viscosity characteristics.

* * * * *